(12) United States Patent
Ponnappan et al.

(10) Patent No.: US 7,840,582 B2
(45) Date of Patent: Nov. 23, 2010

(54) SYSTEM AND METHOD FOR RETRIEVING INFORMATION FROM THE INTERNET BY MEANS OF AN INTELLIGENT SEARCH AGENT

(75) Inventors: Appan Ponnappan, Bangalore (IN); Sri Ramanathan, Lutz, FL (US); Pramod Kumar Honnenahalli Subramanya, Bangalore (IN); Balaji Venkatraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/056,605

(22) Filed: Mar. 27, 2008

(65) Prior Publication Data
US 2009/0248686 A1 Oct. 1, 2009

(51) Int. Cl.
*G06F 7/00* (2006.01)
*G06F 15/16* (2006.01)
(52) U.S. Cl. .................. 707/758; 707/736; 709/217
(58) Field of Classification Search ................. 707/705, 707/706, 736, 758; 709/206, 217
See application file for complete search history.

(56) References Cited

U.S. PATENT DOCUMENTS

| | | | |
|---|---|---|---|
| 7,028,306 | B2 | 4/2006 | Boloker et al. |
| 7,424,516 | B2 * | 9/2008 | Leeds .......................... 709/206 |
| 2005/0125504 | A1 * | 6/2005 | Leeds .......................... 709/217 |
| 2006/0129916 | A1 | 6/2006 | Volk et al. |
| 2006/0155852 | A1 | 7/2006 | Mayer et al. |
| 2006/0253567 | A1 | 11/2006 | Selin et al. |
| 2006/0259492 | A1 | 11/2006 | Jun et al. |
| 2006/0287989 | A1 | 12/2006 | Glance |
| 2007/0043872 | A1 | 2/2007 | Pattan et al. |
| 2007/0094389 | A1 | 4/2007 | Nussey et al. |
| 2007/0100836 | A1 * | 5/2007 | Eichstaedt et al. ............ 707/10 |
| 2007/0100960 | A1 * | 5/2007 | Eichstaedt et al. .......... 709/217 |
| 2007/0143502 | A1 | 6/2007 | Garcia-Martin et al. |
| 2008/0163318 | A1 | 7/2008 | Chen et al. |

OTHER PUBLICATIONS

Guenkova-Luy et al., "End-to-End Quality-of-Service Coordination for Mobile Multimedia Applications," IEEE Journal on Selected Areas in Communications, Jun. 2004. vol. 22, No. 5, pp. 889-903.
Kim et al., "Session and Connection Management for QoS-Guaranteed Multimedia Service Provisioning on IP/MPLS Networks," Computational Science and Its Applications—ICCSA 2005. International Conf. Proceedings, Part II, Lecture Notes in Comp. Science vol. 3481), pp. 157-168, Springer-Verlag, Berlin, Germany, 2005, lxvi+1316 pp. 8 Ref. (Abstract only).

(Continued)

*Primary Examiner*—Hung T Vy
(74) *Attorney, Agent, or Firm*—Schmeiser, Olsen & Watts; John R. Pivnichny

(57) ABSTRACT

A system and associated method for retrieving information from the Internet by an end user through use of an Intelligent Search Agent. Creating an index comprising a least one data structure corresponding to a respective forum. Next, submitting a query to at least one search engine located on a respective Internet server. After submitting the query, posting a question to at least one forum located on a respective Internet server. After posting the question, subscribing to at least one web syndication corresponding to at least one respective forum. After subscribing to at least one web syndication, receiving information from at least one web syndication. Finally, sending the information to said end user.

24 Claims, 6 Drawing Sheets

OTHER PUBLICATIONS

Koutsorodi et al., "Terminal Management and Intelligent Access Selection in Heterogeneous Environments," Mobile Networks and Applications (2006) 11:861-871.

Ruiz et al., "Adaptive Multimedia Multi-Party Communication in ad hoc Environments," Pub.: Proceedings of 37th Annual Hawaii International Conf. on System Sciences, 10 pp., IEEE Comput. Soc., Los Alamitos, CA, USA, 2004, lxxi+320 pp. 28 ref.

Mahy, R., Plantronics, Change Notifications about HyperText Transfer Protocol (HTTP) Resources via the Session Initiation Protocol (SIP) Event Notification Framework; draft-mahy-http-change-notification-via-sip-00.txt., IETF Standard-Working-Draft, Internet Engineering Task Force, IETF, CH Jun. 25, 2007.

U.S. Appl. No. 11/876,926, filed Oct. 23, 2007, Confirmation No. 7075.

* cited by examiner

SYSTEM AND METHOD FOR RETRIEVING INFORMATION FROM THE INTERNET BY MEANS OF AN INTELLIGENT SEARCH AGENT

FIELD OF THE INVENTION

The present invention disclosed a system and method for retrieving information from the internet using traditional search engines as well as web syndication protocols RSS and ATOM.

BACKGROUND OF THE INVENTION

Conventionally, searching for information on the Internet is a manual process. While an end user may utilize search engines to obtain information, the quality of results returned, especially for in specialized technical and potentially arcane fields, sometimes leaves much to be desired. In addition, advertisers may include keywords in web pages which further reduce the quality of search engine results. Furthermore, specialized forums and newsgroups which are devoted to such arcane information are not traditionally indexed by search engines. To further compound the problem, an end user must understand the hierarchy and standards for each forum or newsgroup in order to post a question with the best chance of being answered.

Thus, there is a need for a system and associated method that overcomes at least one of the preceding disadvantages of current methods for retrieving information from the Internet.

SUMMARY OF THE INVENTION

A method for retrieving information from the Internet by an end user through use of an Intelligent Search Agent, said method comprising:

creating an index, said index comprising at least one data structure, each data structure of said at least one data structure corresponding to a respective forum located on a respective Internet server, wherein said creating is performed by said Intelligent Search Agent;

after said creating said index, submitting a query to at least one search engine, wherein each search engine of said at least one search engine is located on a respective Internet server, wherein said submitting is performed by said Intelligent Search Agent after receiving said query from said end user;

after said submitting said query, posting a question to at least one forum, wherein each forum of said at least one forum corresponds to a respective data structure located in said index, wherein said posting is performed by said Intelligent Search Agent after receiving said question from said end user;

after said posting said question, subscribing to at least one web syndication, each web syndication of said at least one web syndication corresponds to a respective forum which said question was posted, wherein said subscribing is performed by said Intelligent Search Agent;

after said subscribing, receiving said information from said at least one web syndication, wherein said information is at least one answer to said question, wherein said receiving is performed by said Intelligent Search Agent; and after said receiving said information, sending said information to said end user, wherein said sending is performed by said Intelligent Search Agent.

The present invention provides a system and method that overcomes at least one of the current disadvantages of conventional methods.

DETAILED DESCRIPTION OF THE DRAWINGS

Figure 1:
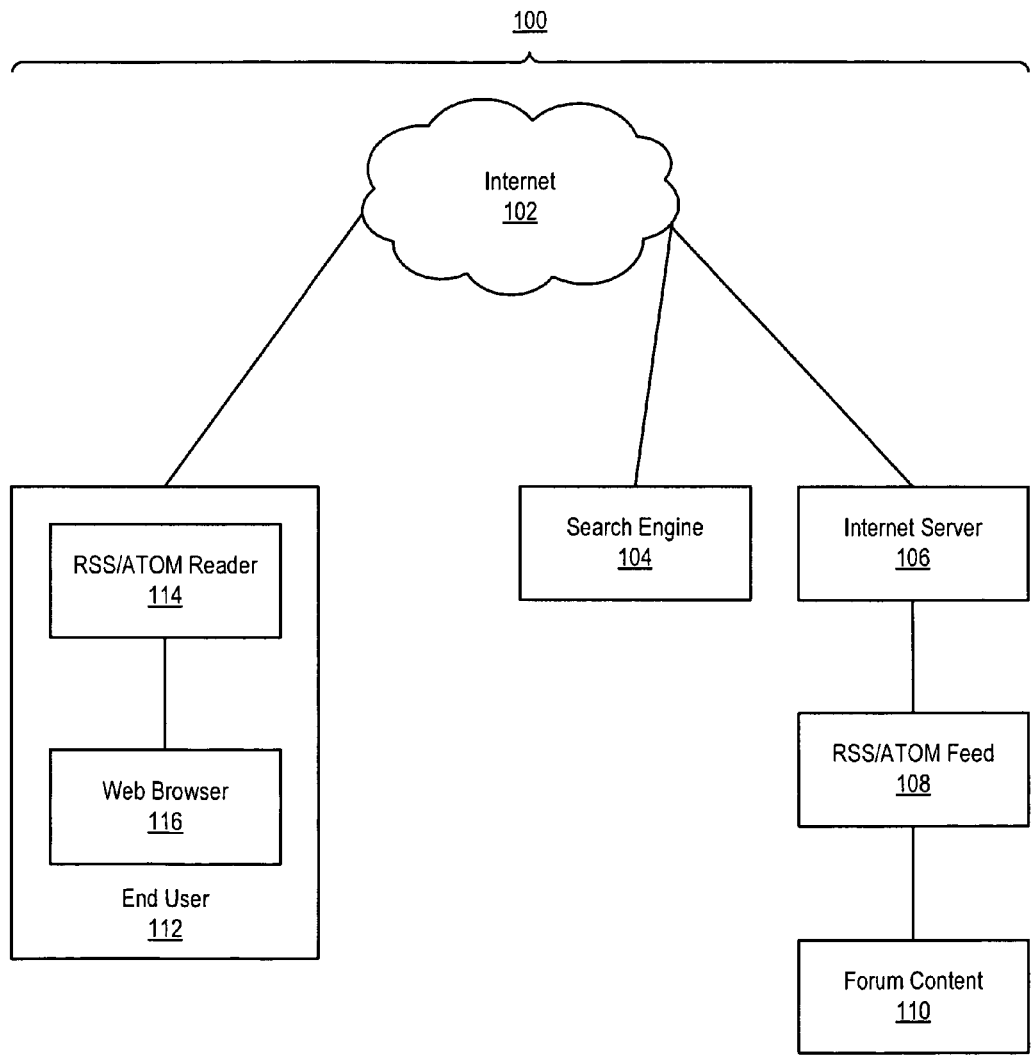
FIG. 1 illustrates a conventional system for retrieving information from the Internet by an end user.

FIG. 1 illustrates a conventional system 100 for retrieving information from the Internet by an end user 112.

The conventional system 100 comprises the Internet 102, a search engine 104, an Internet server 106, an RSS/ATOM feed 108, forum content 110, and an end user 112. The end user 112 comprises an RSS/ATOM reader 114 and a web browser 116. Throughout the specification, the terms content, forum content, and newsgroup content are interchangeably used. Furthermore, throughout the specification, the terms forum and newsgroup are interchangeably used.

A search engine 104 is a program that indexes forum content 110 located on an Internet server 106 connected to the Internet 102. An end user 112 submits a query to a search engine 104 via a web browser 112. The search engine 104 compares the indexed forum content 110 with the query received from the end user 112, returning the location of forum content 110 which match said query.

Forum content 110 is typically a Hypertext Markup Language (HTML) document of a webpage or links to web pages and other kinds of digital media. An RSS/ATOM feed 108 is a document that contains either a summarized or unabridged version of the forum content 110, typically in Extensible Markup Language (XML) format. RSS/ATOM feeding is widely used in publishing real time information. Examples of such content may be, inter alia, stock price ticker, blog entries, news headlines, weather updates, or podcasts.

An RSS/ATOM reader 114 is a software program enabling subscription to an RSS/ATOM feed 108. An end user 112 subscribes to a specific RSS/ATOM feed 108 by entering a link to the RSS/ATOM feed 108 into the RSS/ATOM reader 114 or by clicking an RSS/ATOM icon in a web browser 116. The RSS/ATOM reader 114 polls the RSS/ATOM feed 108 subscribed to by an end user 112 for new forum content 110, and downloads any updates to the RSS/ATOM feed 108.

Figure 2:
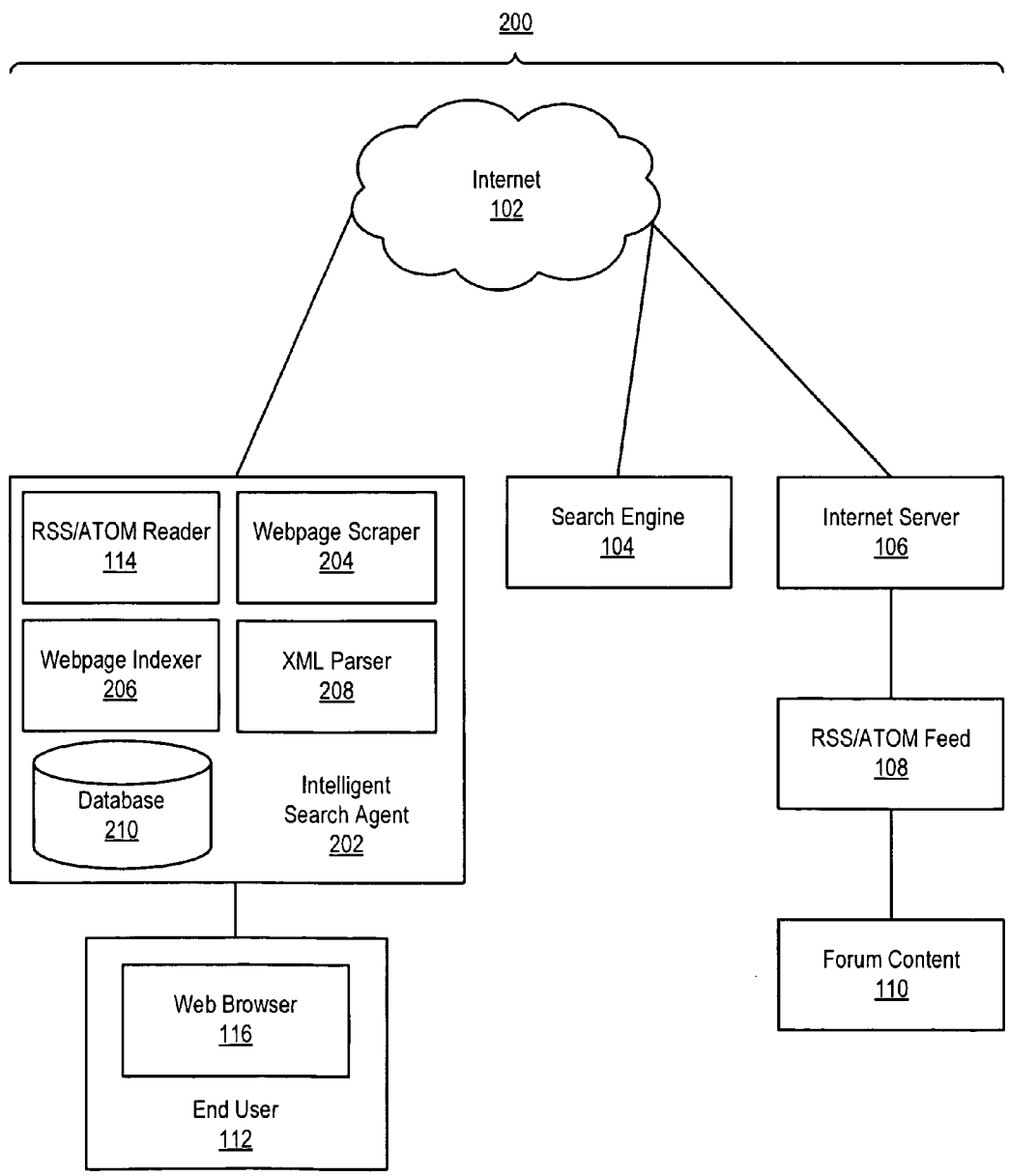
FIG. 2 illustrates a system for retrieving information from the Internet by an end user through the use of an Intelligent Search Agent, in accordance with embodiments of the present invention.

FIG. 2 illustrates a system 200 for retrieving information from the Internet 102 by an end user 112 through the use of an Intelligent Search Agent 202, in accordance with embodiments of the present invention.

The Intelligent Search Agent 202 comprises an RSS/ATOM reader 114, a webpage scraper 204, a webpage indexer 206, an XML parser 208, and a database 210. The webpage scraper 204 converts forum content 110 from an HTML document to an XML document for use by the RSS/ATOM reader 114. The webpage scraper 204 stores the XML document in the database 210. The Intelligent Search Agent 202 utilizes the webpage scraper 204 only when an Internet server 106 contains relevant forum content 110, but lacks an RSS/ATOM feed 108.

The webpage indexer 206 periodically searches an Internet server 106 for the hierarchy in which forum content 110 is stored. The webpage indexer 206 stores the forum content 110 hierarchy in an index, the index being stored in the database 210. The webpage indexer 206 repeats the process for each Internet server 106 the Intelligent Search Agent 202 discovers, creating an index for use by the XML parser 208. The index utilizes XML document formatting to facilitate faster searching.

The XML parser 208 searches the index created by the webpage indexer 206 every time an end user 112 submits a query to a search engine 104. The query is parsed into individual keywords, the XML parser 208 searching the index for each keyword, respectively.

The end user 112 interacts with the Intelligent Search Agent 202 through the use of a web browser 116.

Figure 3:
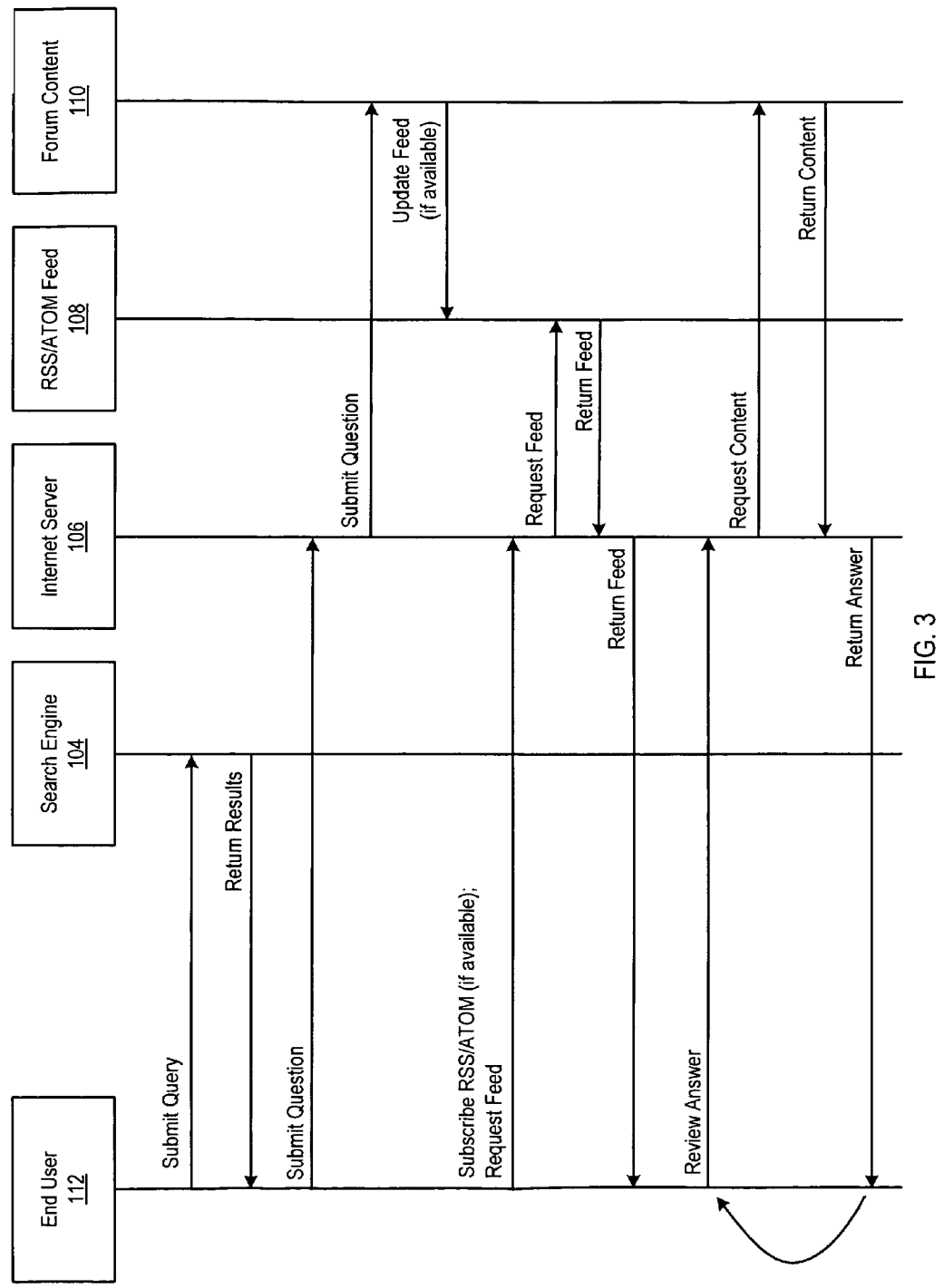
FIG. 3 illustrates a message flow depicting a conventional system for retrieving information from the Internet by an end user in FIG. 1, supra.

FIG. 3 illustrates a message flow depicting a conventional system for retrieving information from the Internet 102 by and end user 112 in FIG., supra.

When an end user 112 requests information from the Internet 102, the end user 112 submits a query to the search engine 104 via the web browser 116. The query is traditionally a keyword search; merely a list of keywords which the search engine 104 compares to a vast index of web pages and web content. The search engine 104 returns a list of results; each result responsive to at least one keyword contained in the original query.

If the list of results proves fruitless, the end user 112 submits a question to a forum located on an appropriate Internet server 106. The Internet server 106 receives the question from the end user 112 and incorporates said question into the forum content 110. If the Internet server 106 provides RSS/ATOM feed capabilities, the RSS/ATOM feed 108 corresponding to the forum content 110 is updated. Selection of the proper forum is crucial to the end user 112 receiving an appropriate response to the question posted. If the end user 112 selects in inappropriate forum to post the question, experts in the field responsive to the question likely will not discover the question or post a meaningful answer.

If the Internet server 106 provides RSS/ATOM feed capabilities, the end user 112 may subscribe to the RSS/ATOM feed 108 via the RSS/ATOM reader 114. The RSS/ATOM reader 114 requests the RSS/ATOM feed 108 from the Internet server 106. The Internet server 106 returns the RSS/ATOM feed 108 to the RSS/ATOM reader 114. The RSS/ATOM reader 114 utilizes the web browser 116 to display the contents of the RSS/ATOM feed 108 to the end user 112. Periodically, the RSS/ATOM reader 114 queries the Internet server 106 for updates made to the RSS/ATOM feed 108. If the RSS/ATOM feed 108 has been updated since the last query from the RSS/ATOM reader 14, the RSS/ATOM reader 114 requests the updated RSS/ATOM feed 108 from the Internet server 106. The updating process is repeated indefinitely until the end user 112 determines either that the RSS/ATOM feed 108 contains an answer to the question posted, or that no answer will likely be provided; at which point the end user 112 stops the RSS/ATOM reader 114 from querying the RSS/ATOM feed 108.

If the Internet server 106 does not provide RSS/ATOM feed capabilities, the end user 112 must manually check for an answer to the question submitted. The end user 112, utilizing the web browser 116, requests content from the Internet server 106, which in turn requests the requisite forum content 110. The forum content 110 is returned to the end user 112 who must search said content for an answer. This process is repeated indefinitely until either the end user 112 determines either that the forum content 110 returns contains an answer to the question posted, or that no answer will likely be provided.

Figure 4:
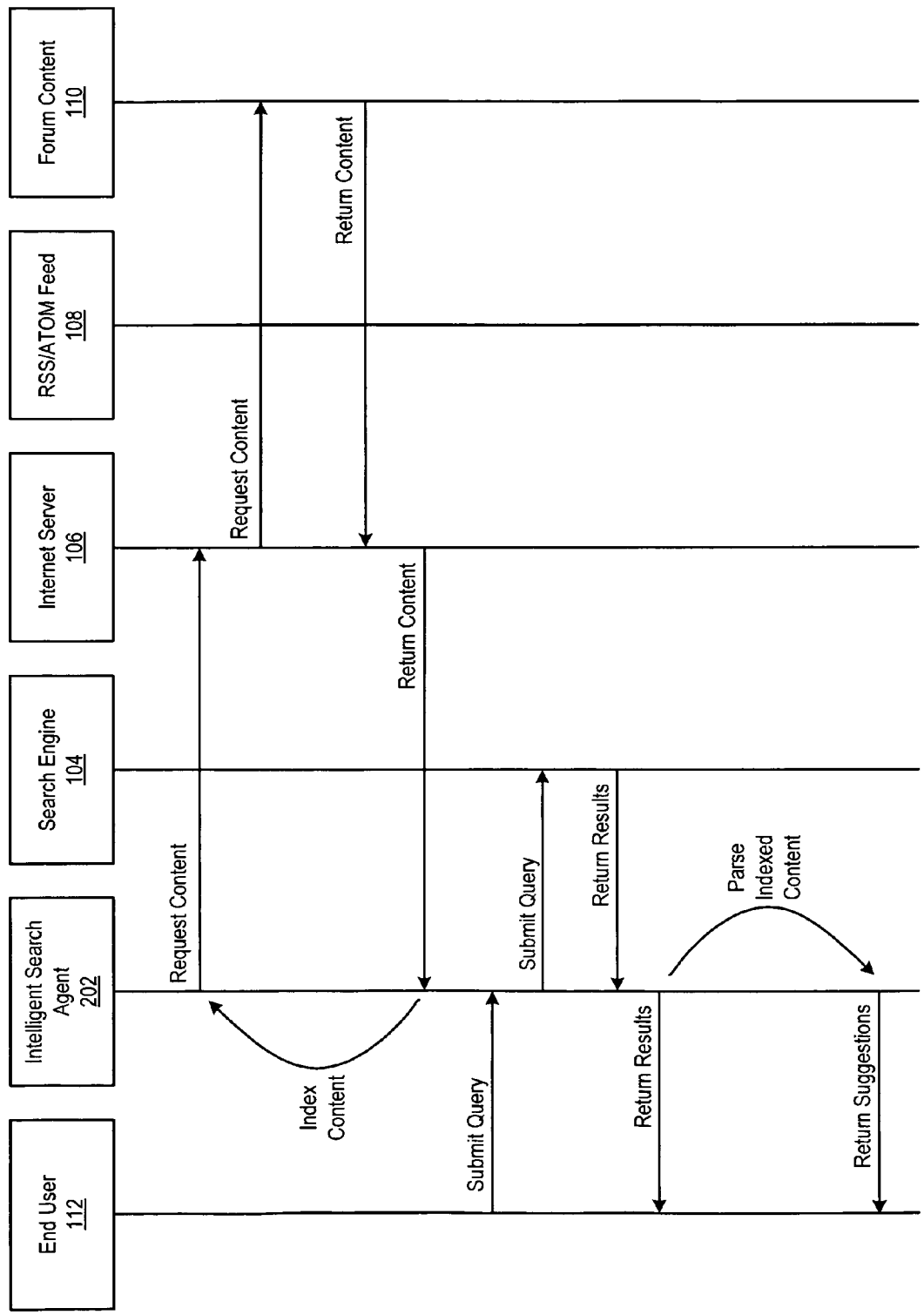
FIG. 4 illustrates a message flow depicting a method for retrieving information from the Internet by an end user through the use of an Intelligent Search Agent of FIG. 2, supra, in accordance with embodiments of the present invention.
Figure 4:
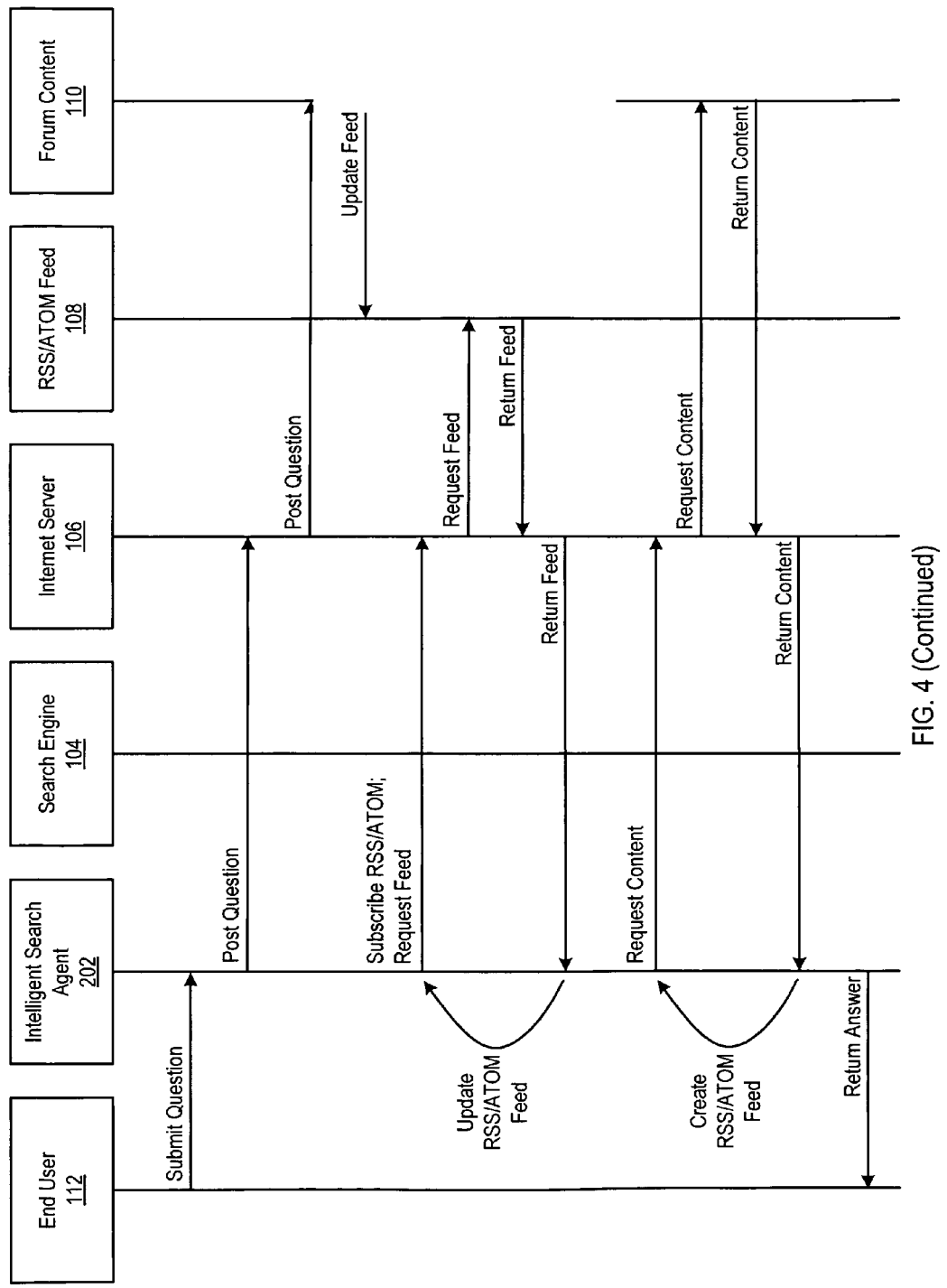

FIG. 4 illustrates a message flow depicting a method for retrieving information from the Internet 102 by an end user 112 through the use of an Intelligent Search Agent 202 of FIG. 2, supra, in accordance with embodiments of the present invention.

Irrespective of whether the end user 112 submits a query or question to the Intelligent Search Agent 202, the Intelligent Search Agent 202 periodically indexes the forum content 110 located on the Internet server 106. The Intelligent Search Agent 202 requests the forum content 110 from the Internet server 106. The Internet server 106 returns the forum content 110 to the Intelligent Search Agent 202 which utilizes the webpage indexer 206 to convert the forum content 110 into a hierarchical XML document called an index. The index is stored in the database 210 for future use. This process is repeated periodically to ensure the Intelligent Search Agent 202 indexes all available forum content 110.

The index comprises a plurality of tree data structures. Each tree comprises a single root node corresponding to the distinct topic of a given forum or newsgroup; a plurality of child nodes each corresponding to a subtopic of the given distinct topic; and a plurality of leaf nodes each corresponding to a conversation or thread within a given subtopic.

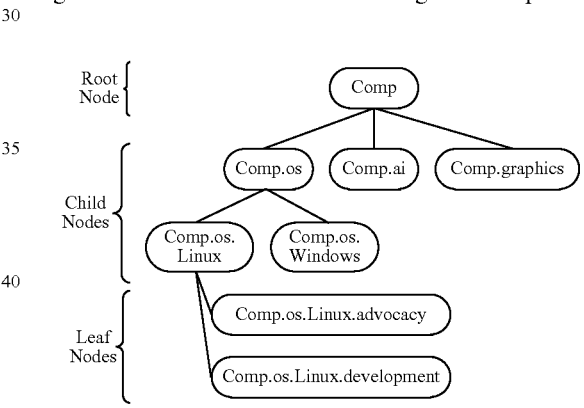

Each node of the tree data structure comprises the name of the current node and the Uniform Resource Identifier (URI). The URI comprises the location on an Internet server 106 which contains the forum content 110 a given node references.

When the end user 112 requests information from the Internet 102, the end user 112 submits a query to the Intelligent Search Agent 202 via the web browser 116. The Intelligent Search Agent 202 in turn submits the query, usually in the form of a keyword search, to a plurality of search engines 104. The search engines 104 return the results responsive to the query to the Intelligent Search Agent 202, which returns the results to the end user 112.

Simultaneously with returning the results to the end user 112, the Intelligent Search Agent 202 utilizes the XML parser 208 to search the index located in the database 210 for nodes responsive to the query. Each word of the query submitted by the end user 112 is parsed through the index and compared to each node contained therein. Nodes which match any word of the query are summarily represented in a first list of suggestions, said first list of suggestions being returned to the end user 112 by the Intelligent Search Agent 202. The end user 112 may select appropriate nodes in which to submit a natural language question.

As noted previously, each node in the index document contains the URI where the specific forum content 110 is located. If the list of suggestions contains a node the end user believes already contains an answer to the question proposed, the end user may review the forum content 110 represented by the node by selecting the node's URI. The web browser 116 displays the forum content 110 located at the requisite URI for the end user 112 to review.

If, however, the end user 112 wishes to submit a natural language question to all or a subset of the nodes identified in the first list of suggestions, the end user must select the requisite nodes and draft an appropriate question. The end user 112 selects the appropriate nodes from the first list and returns a second list to the Intelligent Search Agent 202. The Intelligent Search Agent 202 stores the second list in the database 210 for future use. The end user 112 then submits the question to the Intelligent Search Agent 202, which in turn locates the URI for each node selected by the end user 112. The Intelligent Search Agent 202 submits the question to each Internet server 106 with a URI corresponding to a selected node. The Internet server 106 posts the question to the appropriate forum identified and updates the RSS/ATOM feed 108 for the given forum content 110, if available.

If the Internet server 106 provides RSS/ATOM feed capabilities, the Intelligent Search Agent 202 subscribes to the RSS/ATOM feed 108 via the RSS/ATOM reader 114. The RSS/ATOM reader 114 requests the RSS/ATOM feed 108 from the Internet server 106. The Internet server 106 returns the RSS/ATOM feed 108 to the RSS/ATOM reader 114. The RSS/ATOM reader 114 utilizes the web browser 116 to display the contents of the RSS/ATOM feed 108 to the end user 112. Periodically, the RSS/ATOM reader 114 queries the Internet server 106 for updates made to the RSS/ATOM feed 108. If the RSS/ATOM feed 108 has been updated since the last query from the RSS/ATOM reader 14, the RSS/ATOM reader 114 requests the updated RSS/ATOM feed 108 from the Internet server 106. The process of requesting RSS/ATOM feeds 108 is repeated indefinitely until an answer to the question posted is contained in the RSS/ATOM feed 108. Once an answer to the question is received by the Intelligent Search Agent 202, said answer is returned to the end user 112.

If the Internet server 106 does not provide RSS/ATOM feed capabilities, the Intelligent Search Agent 202 utilizes the webpage scraper 204 to create the necessary feeds. The Intelligent Search Agent 202 requests content from the Internet server 106, which in turn requests the requisite forum content 110. The requested forum content 110 is returned to the Intelligent Search Agent 202. The webpage scraper 204 then converts the forum content 110 from HTML to scraped XML and stores the scraped XML files in the database 210. The RSS/ATOM reader 114 subscribes to the scraped XML in the same way the RSS/ATOM reader 114 would subscribe to RSS/ATOM feeds 108. The process of scraping forum content 110 by means of the webpage scraper 204 is repeated indefinitely until an answer to the question posted is contained in the scraped XML. Once an answer to the question is received by the Intelligent Search Agent 202, said answer is returned to the end user 112.

Figure 5:
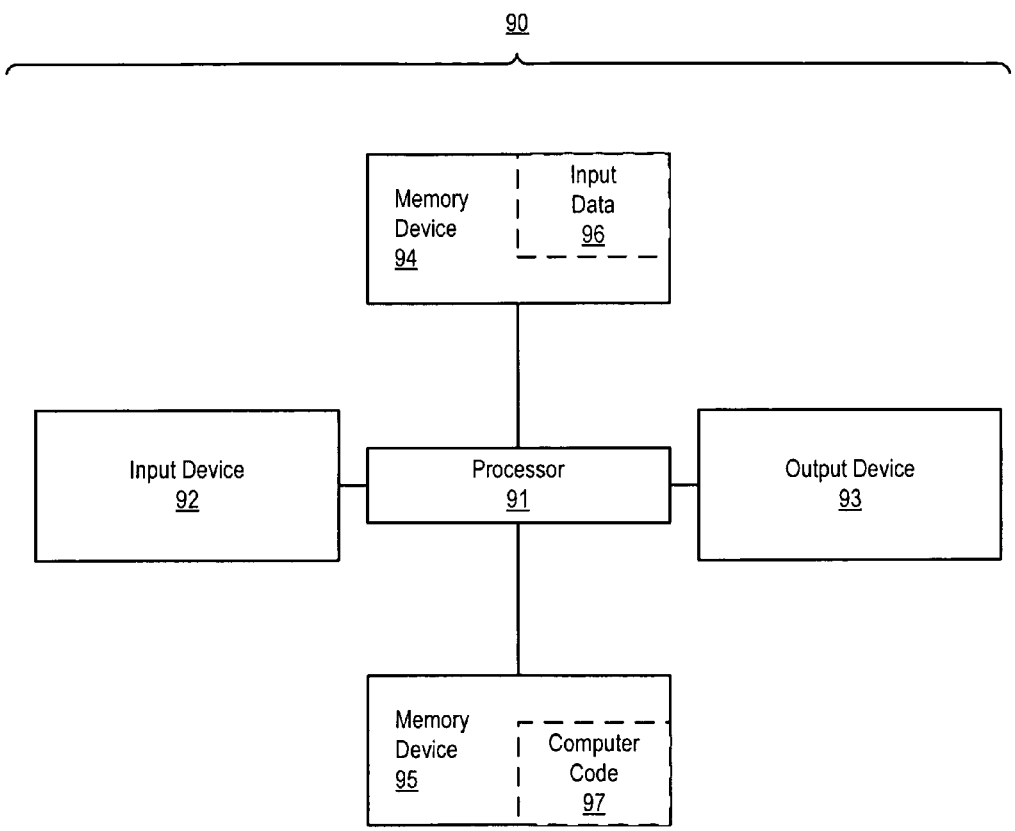
FIG. 5 illustrates a computer system used for retrieving information from the Internet by an end user through the use of an Intelligent Search Agent of FIG. 2, supra, in accordance with embodiments of the present invention.

FIG. 5 illustrates a computer system used for retrieving information from the Internet 102 by an end user 112 through the use of an Intelligent Search Agent 202 of FIG. 2, supra, in accordance with embodiments of the present invention.

The computer system 900 comprises a processor 908, an input device 906 coupled to the processor 908, an output device 910 coupled to the processor 908, and memory devices 902 and 912 each coupled to the processor 908. The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions. The computer code 914 includes, inter alia, an algorithm used for retrieving information from the Internet 102 by an end user 112 through the use of an Intelligent Search Agent 202 of FIG. 2, supra, according to the present invention.

The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 9) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for retrieving information from the Internet 102 by an end user 112 through the use of an Intelligent Search Agent 202 of FIG. 2, supra. Thus, the present invention discloses a process for supporting computer infrastructure, comprising integrating, hosting, maintaining and deploying computer-readable code into a computing system (e.g., computing system 900), wherein the code in combination with the computing system is capable of performing a method for app retrieving information from the Internet 102 by an end user 112 through the use of an Intelligent Search Agent 202 of FIG. 2, supra.

In another embodiment, the invention provides a business method that performs the process steps of the invention on a subscription, advertising and/or fee basis. That is, a service provider, such as a Solution Integrator, can offer to create, maintain, support, etc. a process for retrieving information from the Internet 102 by an end user 112 through the use of an Intelligent Search Agent 202 of FIG. 2, supra, of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 900 as a particular configuration of hardware and software, any configuration of hardware and software, as would be known to a person of ordinary skill in the art, may be utilized for the purposes stated supra in conjunction with the particular computer system 900 of FIG. 5. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for retrieving information from the Internet by an end user through use of an Intelligent Search Agent, said method comprising:

creating an index, said index comprising at least one data structure, each data structure of said at least one data structure corresponding to a respective forum located on a respective Internet server, wherein said creating is performed by said Intelligent Search Agent;

after said creating said index, submitting a query to at least one search engine, wherein each search engine of said at least one search engine is located on a respective Internet server, wherein said submitting is performed by said Intelligent Search Agent after receiving said query from said end user;

after said submitting said query, posting a question to at least one forum, wherein each forum of said at least one forum corresponds to a respective data structure located in said index, wherein said posting is performed by said Intelligent Search Agent after receiving said question from said end user;

after said posting said question, subscribing to at least one web syndication, each web syndication of said at least one web syndication corresponds to a respective forum which said question was posted, wherein said subscribing is performed by said Intelligent Search Agent;

after said subscribing, receiving said information from said at least one web syndication, wherein said information is at least one answer to said question, wherein said receiving is performed by said Intelligent Search Agent; and after said receiving said information, sending said information to said end user, wherein said sending is performed by said Intelligent Search Agent.

2. The method of claim 1, wherein each data structure of said at least one data structure is a tree data structure comprising:

a root node, at least one child node, and at least one leaf node, wherein said root node, said at least one child node, and said at least one leaf node are liked in a hierarchy, wherein said root node comprises a name corresponding to a topic of said respective forum, wherein each child node of said at least one child node comprises a name corresponding to a subtopic of said topic of said respective forum, and a Uniform Resource Identifier (URI) corresponding to an Internet address where said subtopic is located, wherein each leaf node of said at least one leaf node comprises a name corresponding to a conversation of a subtopic of said topic of said respective forum and a URI corresponding to an Internet address where said conversation is located.

3. The method of claim 1, said creating said index further comprising:

storing said index in a database.

4. The method of claim 1, said submitting said query further comprises:

receiving at least one result, wherein each result of said at least one result corresponds to said respective search engine wherein said query was submitted; and after said receiving said at least one result, sending said at least one result to said end user.

5. The method of claim 1, said posting said question comprising:

parsing said query into at least one keyword, wherein each keyword of said at least one keyword corresponds to a respective portion of said query;

after said parsing said query, searching said index for each keyword of said at least one keyword, wherein said searching comprises: identifying at least one matching node, wherein each matching node of said at least one matching node corresponds to a keyword of said at least one keyword;

after said searching said index, creating a first list, wherein said first list comprises said name of each matching node of said at least one matching node and said URI of each matching node of said at least one matching node;

after said creating said first list, sending said first list to said end user;

after said sending said first list, receiving a second list from said end user, wherein said second list comprises a subset of said first list which selected by said end user;

after said receiving said second list, storing said second list in said database;

receiving said question from said end user, wherein said question is a natural language translation of said query; and after said receiving said second list and after said receiving said question, posting said question to each URI of each matching node of said at least one matching node contained in said second list.

6. The method of claim 1, said subscribing comprising:

retrieving each URI of each matching node of said at least one matching node contained in said second list;

after said retrieving, determining whether each URI of each matching node of said at least one matching node contains a respective web syndication;

after said determining, for each URI of each matching node of said at least one matching node containing said respective web syndication, subscribing to said respective web syndication; and after said determining, for each URI of each matching node of said at least one matching node not containing said respective web syndication, creating a respective web syndication, wherein said creating said respective web syndication comprises: scraping web content located at each URI of at least one URI not containing said respective web syndication into a respective feed document; storing said respective feed document in said database; and subscribing to said respective feed document.

7. A computer program product, comprising a computer usable medium having a computer readable program code embodied therein, said computer readable program code containing instructions that when executed by a processor of a computer system implement a method for retrieving information from the Internet by an end user through use of an Intelligent Search Agent, said method comprising:

creating an index, said index comprising at least one data structure, each data structure of said at least one data structure corresponding to a respective forum located on a respective Internet server, wherein said creating is performed by said Intelligent Search Agent;

after said creating said index, submitting a query to at least one search engine, wherein each search engine of said at least one search engine is located on a respective Internet server, wherein said submitting is performed by said Intelligent Search Agent after receiving said query from said end user;

after said submitting said query, posting a question to at least one forum, wherein each forum of said at least one forum corresponds to a respective data structure located in said index, wherein said posting is performed by said Intelligent Search Agent after receiving said question from said end user;

after said posting said question, subscribing to at least one web syndication, each web syndication of said at least one web syndication corresponds to a respective forum which said question was posted, wherein said subscribing is performed by said Intelligent Search Agent;

after said subscribing, receiving said information from said at least one web syndication, wherein said information is at least one answer to said question, wherein said receiving is performed by said Intelligent Search Agent; and after said receiving said information, sending said information to said end user, wherein said sending is performed by said Intelligent Search Agent.

8. The computer program product of claim 7, wherein each data structure of said at least one data structure is a tree data structure comprising:

a root node, at least one child node, and at least one leaf node, wherein said root node, said at least one child node, and said at least one leaf node are liked in a hierarchy, wherein said root node comprises a name corresponding to a topic of said respective forum, wherein each child node of said at least one child node comprises a name corresponding to a subtopic of said topic of said respective forum, and a Uniform Resource Identifier (URI) corresponding to an Internet address where said subtopic is located, wherein each leaf node of said at least one leaf node comprises a name corresponding to a conversation of a subtopic of said topic of said respective forum and a URI corresponding to an Internet address where said conversation is located.

9. The computer program product of claim 7, said creating said index further comprising:

storing said index in a database.

10. The computer program product of claim 7, said submitting said query further comprises:

receiving at least one result, wherein each result of said at least one result corresponds to said respective search engine wherein said query was submitted; and after said receiving said at least one result, sending said at least one result to said end user.

11. The computer program product of claim 7, said posting said question comprising:

parsing said query into at least one keyword, wherein each keyword of said at least one keyword corresponds to a respective portion of said query;

after said parsing said query, searching said index for each keyword of said at least one keyword, wherein said searching comprises: identifying at least one matching node, wherein each matching node of said at least one matching node corresponds to a keyword of said at least one keyword;

after said searching said index, creating a first list, wherein said first list comprises said name of each matching node of said at least one matching node and said URI of each matching node of said at least one matching node;

after said creating said first list, sending said first list to said end user;

after said sending said first list, receiving a second list from said end user, wherein said second list comprises a subset of said first list which selected by said end user;

after said receiving said second list, storing said second list in said database;

receiving said question from said end user, wherein said question is a natural language translation of said query; and after said receiving said second list and after said receiving said question, posting said question to each URI of each matching node of said at least one matching node contained in said second list.

12. The computer program product of claim 7, said subscribing comprising:

retrieving each URI of each matching node of said at least one matching node contained in said second list;

after said retrieving, determining whether each URI of each matching node of said at least one matching node contains a respective web syndication;

after said determining, for each URI of each matching node of said at least one matching node containing said respective web syndication, subscribing to said respective web syndication; and after said determining, for each URI of each matching node of said at least one matching node not containing said respective web syndication, creating a respective web syndication, wherein said creating said respective web syndication comprises: scraping web content located at each URI of at least one URI not containing said respective web syndication into a respective feed document; storing said respective feed document in said database; and subscribing to said respective feed document.

13. A computer system comprising a processor and a computer readable memory unit coupled to the processor, said memory unit containing instructions that when executed by the processor implement a method for retrieving information from the Internet by an end user through use of an Intelligent Search Agent, said method comprising:

creating an index, said index comprising at least one data structure, each data structure of said at least one data structure corresponding to a respective forum located on a respective Internet server, wherein said creating is performed by said Intelligent Search Agent;

after said creating said index, submitting a query to at least one search engine, wherein each search engine of said at least one search engine is located on a respective Internet server, wherein said submitting is performed by said Intelligent Search Agent after receiving said query from said end user;

after said submitting said query, posting a question to at least one forum, wherein each forum of said at least one forum corresponds to a respective data structure located in said index, wherein said posting is performed by said Intelligent Search Agent after receiving said question from said end user;

after said posting said question, subscribing to at least one web syndication, each web syndication of said at least one web syndication corresponds to a respective forum which said question was posted, wherein said subscribing is performed by said Intelligent Search Agent;

after said subscribing, receiving said information from said at least one web syndication, wherein said information is at least one answer to said question, wherein said receiving is performed by said Intelligent Search Agent; and after said receiving said information, sending said information to said end user, wherein said sending is performed by said Intelligent Search Agent.

14. The computer system of claim 13, wherein each data structure of said at least one data structure is a tree data structure comprising:
- a root node, at least one child node, and at least one leaf node, wherein said root node, said at least one child node, and said at least one leaf node are liked in a hierarchy, wherein said root node comprises a name corresponding to a topic of said respective forum, wherein each child node of said at least one child node comprises a name corresponding to a subtopic of said topic of said respective forum, and a Uniform Resource Identifier (URI) corresponding to an Internet address where said subtopic is located, wherein each leaf node of said at least one leaf node comprises a name corresponding to a conversation of a subtopic of said topic of said respective forum and a URI corresponding to an Internet address where said conversation is located.

15. The computer system of claim 13, said creating said index further comprising:
- storing said index in a database.

16. The computer system of claim 13, said submitting said query further comprises:
- receiving at least one result, wherein each result of said at least one result corresponds to said respective search engine wherein said query was submitted; and
- after said receiving said at least one result, sending said at least one result to said end user.

17. The computer system of claim 13, said posting said question comprising:
- parsing said query into at least one keyword, wherein each keyword of said at least one keyword corresponds to a respective portion of said query;
- after said parsing said query, searching said index for each keyword of said at least one keyword, wherein said searching comprises: identifying at least one matching node, wherein each matching node of said at least one matching node corresponds to a keyword of said at least one keyword;
- after said searching said index, creating a first list, wherein said first list comprises said name of each matching node of said at least one matching node and said URI of each matching node of said at least one matching node;
- after said creating said first list, sending said first list to said end user;
- after said sending said first list, receiving a second list from said end user, wherein said second list comprises a subset of said first list which selected by said end user;
- after said receiving said second list, storing said second list in said database;
- receiving said question from said end user, wherein said question is a natural language translation of said query; and
- after said receiving said second list and after said receiving said question, posting said question to each URI of each matching node of said at least one matching node contained in said second list.

18. The computer system of claim 13, said subscribing comprising:
- retrieving each URI of each matching node of said at least one matching node contained in said second list;
- after said retrieving, determining whether each URI of each matching node of said at least one matching node contains a respective web syndication;
- after said determining, for each URI of each matching node of said at least one matching node containing said respective web syndication, subscribing to said respective web syndication; and
- after said determining, for each URI of each matching node of said at least one matching node not containing said respective web syndication, creating a respective web syndication, wherein said creating said respective web syndication comprises: scraping web content located at each URI of at least one URI not containing said respective web syndication into a respective feed document; storing said respective feed document in said database; and subscribing to said respective feed document.

19. A process for supporting computer infrastructure, said process comprising providing at least one support service for at least one of creating, integrating, hosting, maintaining, and deploying computer-readable code in a computing system, wherein the code in combination with the computing system is capable of performing a method for retrieving information from the Internet by an end user through use of an Intelligent Search Agent, said method comprising:
- creating an index, said index comprising at least one data structure, each data structure of said at least one data structure corresponding to a respective forum located on a respective Internet server, wherein said creating is performed by said Intelligent Search Agent;
- after said creating said index, submitting a query to at least one search engine, wherein each search engine of said at least one search engine is located on a respective Internet server, wherein said submitting is performed by said Intelligent Search Agent after receiving said query from said end user;
- after said submitting said query, posting a question to at least one forum, wherein each forum of said at least one forum corresponds to a respective data structure located in said index, wherein said posting is performed by said Intelligent Search Agent after receiving said question from said end user;
- after said posting said question, subscribing to at least one web syndication, each web syndication of said at least one web syndication corresponds to a respective forum which said question was posted, wherein said subscribing is performed by said Intelligent Search Agent;
- after said subscribing, receiving said information from said at least one web syndication, wherein said information is at least one answer to said question, wherein said receiving is performed by said Intelligent Search Agent; and
- after said receiving said information, sending said information to said end user, wherein said sending is performed by said Intelligent Search Agent.

20. The process of claim 19, wherein each data structure of said at least one data structure is a tree data structure comprising:
- a root node, at least one child node, and at least one leaf node, wherein said root node, said at least one child node, and said at least one leaf node are liked in a hierarchy, wherein said root node comprises a name corresponding to a topic of said respective forum, wherein each child node of said at least one child node comprises a name corresponding to a subtopic of said topic of said respective forum, and a Uniform Resource Identifier (URI) corresponding to an Internet address where said subtopic is located, wherein each leaf node of said at least one leaf node comprises a name corresponding to a conversation of a subtopic of said topic of said respective forum and a URI corresponding to an Internet address where said conversation is located.

21. The process of claim 19, said creating said index further comprising:
- storing said index in a database.

22. The process of claim 19, said submitting said query further comprises:
  receiving at least one result, wherein each result of said at least one result corresponds to said respective search engine wherein said query was submitted; and
  after said receiving said at least one result, sending said at least one result to said end user.

23. The process of claim 19, said posting said question comprising:
  parsing said query into at least one keyword, wherein each keyword of said at least one keyword corresponds to a respective portion of said query;
  after said parsing said query, searching said index for each keyword of said at least one keyword, wherein said searching comprises: identifying at least one matching node, wherein each matching node of said at least one matching node corresponds to a keyword of said at least one keyword;
  after said searching said index, creating a first list, wherein said first list comprises said name of each matching node of said at least one matching node and said URI of each matching node of said at least one matching node;
  after said creating said first list, sending said first list to said end user;
  after said sending said first list, receiving a second list from said end user, wherein said second list comprises a subset of said first list which selected by said end user;
  after said receiving said second list, storing said second list in said database;
  receiving said question from said end user, wherein said question is a natural language translation of said query; and
  after said receiving said second list and after said receiving said question, posting said question to each URI of each matching node of said at least one matching node contained in said second list.

24. The process of claim 19, said subscribing comprising:
  retrieving each URI of each matching node of said at least one matching node contained in said second list;
  after said retrieving, determining whether each URI of each matching node of said at least one matching node contains a respective web syndication;
  after said determining, for each URI of each matching node of said at least one matching node containing said respective web syndication, subscribing to said respective web syndication; and
  after said determining, for each URI of each matching node of said at least one matching node not containing said respective web syndication, creating a respective web syndication, wherein said creating said respective web syndication comprises: scraping web content located at each URI of at least one URI not containing said respective web syndication into a respective feed document; storing said respective feed document in said database; and subscribing to said respective feed document.

* * * * *